H. O. COOK.
Solar-Compasses.
No. 149,837. Patented April 21, 1874.
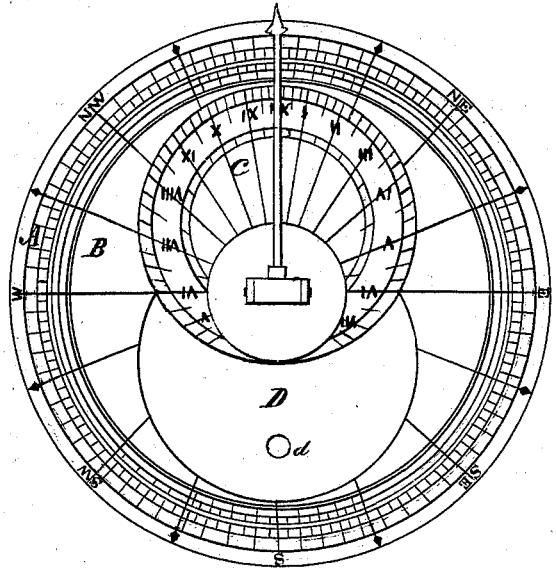
Fig. 1.
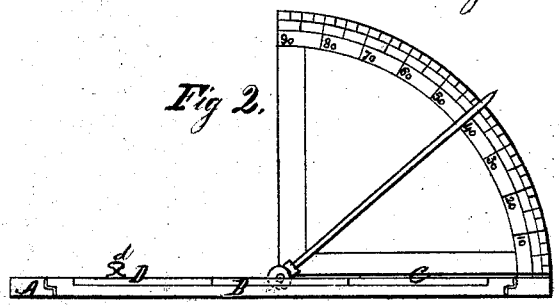
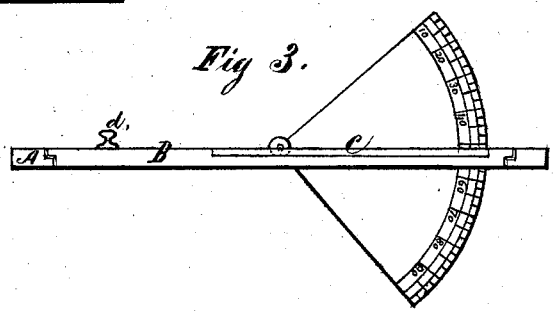
Witnesses.                                   Inventor.
Sidor Grayhead                   Elliott F. Shepard
James L. Onderdonk            Attorney for Henry O. Cook

UNITED STATES PATENT OFFICE.

HENRY O. COOK, OF NEW YORK, N. Y., ASSIGNOR TO THE MARINE VARIOMETER COMPANY.

IMPROVEMENT IN SOLAR COMPASSES.

Specification forming part of Letters Patent No. 149,837, dated April 21, 1874; application filed January 5, 1874.

*To all whom it may concern:*

Be it known that I, HENRY O. COOK, of New York, in the county and State of New York, have invented certain new and useful Improvements in Solar Compasses, constituting an instrument which is specially adapted for testing the accuracy of marine compasses, though it may also be used for any of the purposes for which the magnetic compass is commonly used; and of this invention the following is a complete specification and description, reference being had to the accompanying drawing, which makes a part of the same, in which—

Figure 1 represents the face of the instrument, showing the dial and all of the improvements. Fig. 2 shows a graduated limb or arc used in adjusting the instrument for latitude, and Fig. 3 shows a modified form of the instrument.

The invention herein set forth relates more particularly to that form of instrument for which Letters Patent of the United States, No. 141,766, were, on the 12th day of August, 1873, granted to The Marine Variometer Company, and consists, especially, in addition to the instrument therein described, of an hour-dial, by the use of which the instrument may be used at any hour of day; and in the use of an adjustable gnomon, by which the instrument is rendered useful in all latitudes, as well as in certain details hereinafter described and pointed out.

In the drawing, A is a ring-dial, having the points of the compass fully laid out upon its upper surface, and which revolves freely on a circular box-hinge or gimbals, like a compass, as in the former patent above referred to, so that the dial may always maintain a perfectly-level position. B is an interior dial, set into the first, and moving freely therein, and also marked with the points of the compass. Into this interior dial two disks, which overlap each other at the center, are cut, a portion of the dial B, of a circular shape, being left at the center. One of these disks lies to the north and the other to the south point of the dial B; and they are made exactly alike in size and shape. In one of them is placed a third dial, C, of paper or ivory, which may be covered with glass, and the other is filled with a brass disk, D, supplied with a knob, $d$, by means of which the dial B may be rotated on the dial A. The dial C is marked with hour-lines, from the center of the dial B, in the manner of a sun-dial; and these lines are to be laid out by the trigonometrical formula used in the construction of horizontal sun-dials, as the ordinary geometrical formula will not be found, in practice, sufficiently accurate. Each compass is preferably provided with a series of these hour-dials, C, graduated for various latitudes. For ordinary purposes, a separate dial for each five degrees will give results sufficiently accurate, but the greater number—*i. e.*, the less variation in degrees of latitude between any consecutive two of the series—the greater the degree of accuracy attained. At the center of the dial B is hinged a gnomon, which may be in the form shown, or in any of the ordinary forms used in the construction of sun-dials, except that it should be pivoted. When in the form of a needle, as shown, it may have, at its base, a graduated limb or arc, on which is marked the degrees of the circle from one to ninety, and ninety back to one, to be used as a latitude-arc. Instead of the needle, a graduated semicircle or quadrant might be used, turning about the same center, and passing down through a slit in the dial, as shown in Fig. 3. This semicircle should be graduated in degrees, and thus could be set to any latitude, its upper edge forming a gnomon.

The operation of the device is as follows: At the noon hour it is used substantially as the one described in the former patent, except that the gnomon should be first adjusted to the latitude of the place where the instrument is to be used, by means of the latitude-arc; or, if preferred, by means of a separate instrument, laid out in degrees like a draftman's protractor, such as is shown in Fig. 2. This same improvement of a gnomon, adjustable to the latitude, may also be applied to instruments constructed like that shown in the former patent, without the hour-dial. As the instrument is a true rotary sun-dial, with an adjustable gnomon, it follows that, if placed with the noon-mark on the meridian, and the gnomon properly adjusted, it will give the hour of the day; so, conversely, if the dial B be rotated at any hour of the day until the shadow falls upon the line of that hour, then the noon-line or the north point of the dial B will be in the meridian. The outer dial A may then be turned from the dial B a sufficient number of degrees to allow for the variations caused by the atmospheric refraction and the variations of the compass, and also for the variation caused by the difference between solar and mean time, the proper number of degrees being ascertained from the nautical almanac, and the instrument compared with the magnetic compass, which may be corrected thereby. The dial C and the plate or disk $d$ being readily exchanged, the instrument can be used in north or south latitude; or, instead of a brass plate, D, another dial graduated as C, may be used, which will avoid any necessity for making the latter removable.

In clear weather, and by day, the instrument can be used as a compass, but it is principally intended to be used as a standard by which the latter can be corrected. The addition of the hour and the adjustable gnomon will, it will readily be seen, vastly extend its usefulness in this respect. Of course, many variations can be made in the construction of the details; as, instead of a gnomon casting a shadow, one marking by a beam of light shining through a fine slit may be used, and the outer ring may be dispensed with, the allowance for variations being made mentally, or in setting the gnomon.

What I claim in these Letters Patent to be my invention, and to have secured thereby, is—

1. The combination of a horizontal rotary dial, having the points of the compass, or a portion of them, laid out thereon, with the hour-dial and the gnomon, the latter being adjustable, all constructed and arranged substantially as described.

2. The combination, with the horizontal rotary dial, of the adjustable gnomon, substantially as described.

3. The reversible plate D and dial C, whereby the instrument is rendered useful in north or south latitude, substantially as described.

4. The improved solar compass, as herein described, embodying in its construction horizontal rotary dials, an adjustable gnomon, and a series of interchangeable hour-dials, substantially as set forth.

HENRY O. COOK.

Witnesses:
   J. C. BROCKLEBANK,
   J. F. HARRISON.